March 31, 1970  A. N. MARIANO  3,504,178

METHOD FOR DETERMINING CRYSTALLOGRAPHIC ORIENTATION

Filed May 28, 1968  2 Sheets-Sheet 1

INVENTOR.
ANTHONY N. MARIANO
BY
Kenway, Jenney + Hildreth

March 31, 1970     A. N. MARIANO     3,504,178

METHOD FOR DETERMINING CRYSTALLOGRAPHIC ORIENTATION

Filed May 28, 1968     2 Sheets-Sheet 2

INVENTOR.
ANTHONY N. MARIANO
BY
Kenway, Jenney + Hildreth

United States Patent Office 3,504,178
Patented Mar. 31, 1970

3,504,178
METHOD FOR DETERMINING CRYSTALLOGRAPHIC ORIENTATION
Anthony N. Mariano, Marlboro, Mass., assignor to Kennecott Copper Corporation, New York, N.Y., a corporation of New York
Original application May 14, 1965, Ser. No. 455,716. Divided and this application May 28, 1968, Ser. No. 738,763
Int. Cl. G01n 23/20
U.S. Cl. 250—51.5                        4 Claims

ABSTRACT OF THE DISCLOSURE

Crystal orientation is determined using a single Laue photograph which is employed to determine the orientation of the crystal for scanning on an X-ray diffractometer.

---

This application is a division of application Ser. No. 455,716 filed May 14, 1965, now abandoned.

My invention relates to a method and apparatus for determining crystal orientation. In particular, it relates to a method and apparatus for determining crystal orientation by means of a diffractometer and a single Laue photograph.

In recent years, the physical and chemical properties of materials have undergone an increasingly detailed investigation. It is well known that the structure of material strongly influences its properties and accordingly the attention of experimental metallurgists has often strongly centered on the determination and classification of the structural properties of a wide variety of materials. Many materials exhibit a regular structure on the atomic level; an example of this is found in crystalline materials, which exhibit an ordered and repeated structure throughout the extent of the crystal. If a suitable reference system is chosen at any point within the crystal, it will be found that the atoms with the structure may be considered to lie in planes which intercept the reference axes at various distances. The magnitude of the intercept of these planes with the reference axes is characteristic of the plane under consideration and serves to identify the plane. For various reasons however, which need not be considered here, it has been found useful to identify the crystal planes by means of the reciprocals of these intercepts; these reciprocals are well known as the Miller indices of the plane. Thus the (224) plane of a crystal may be recognized as that plane which intersects the three reference axes at ½ unit, ½ unit, and ¼ unit from the reference origin respectively. The number and types of planes which a crystal possesses, the spacing between these planes, and the angles which these planes make with the reference axes are important characteristics of the particular crystal under study. The orientation of these planes with respect to the reference axes will hereinafter be referred to as the crystal orientation.

Several techniques have been utilized for determining crystal orientation, most of which are of limited applicability. Thus, for example, the internal structure of a crystal may often be releaved by examination of the external faces of the crystal or by examining the manner in which a crystal may be broken into separate pieces by pressure at various surface points thereof. A more powerful and more nearly exact technique for the determination of crystal orientation, however, lies in the use of X-ray analysis. Since the spacing of the atoms within the crystal structure is of the order of the wave length of X-rays (1–2 angstroms), crystals which are irradiated with X-rays will diffract these rays in a determinable manner. Indeed it has been found that if a plane of a crystal is exposed to X-rays, the crystal will diffract these rays at an angle given by $n\lambda = 2d \sin \theta$, where $n$ is any integer and denotes the "order" of diffraction, $\lambda$ is the wave length of the incident X-rays, $d$ is the spacing between parallel crystal planes (interplanar spacing) and $\theta$ is the angle between the incident X-ray and the crystal plane (the angle between the diffracted ray and the crystal plane also equals $\theta$). This relation is known as Bragg's law and the angle $\theta$ is known as the Bragg angle. The diffracted rays may be detected and measured by photographic or electronic means to provide an indication of the crystal orientation or may be subjected to X-ray analysis by means of a diffractometer, for example, which consists of a table for mounting a crystal specimen, a source of monochromatic X-rays for irradiating the specimen, and a detector for measuring the orientation and intensity of the diffracted rays.

One well known method for performing the initial orientation of the crystal is to utilize a back reflection Laue photograph technique in which the crystal having planes whose orientation is unknown is irradiated with X-rays and the diffracted rays from the crystal are intercepted by a photographic plate on which the diffracted rays impinge, thereby causing a series of spots to appear on the film. These spots are due to the rays diffracted from various planes within the crystal and the location and spacing of the spots may be used to determine the crystal orientation. In particular, the angular orientation of any one of these spots with respect to the center of the film will define the location of the normal to the plane responsible for the diffraction associated with that spot. The identification of this plane will still be incomplete, however, since the crystallographer must know not only the relative orientation of the plane causing the diffraction (as determined by the Laue photograph) but must also have some knowledge of the interplanar angles or interplanar spacing before Miller indices can be assigned to the planes. The process of determining the orientation of unidentified planes in the crystal will be referred to herein as relative orientation of the crystal, while the process of determining the orientation of unidentified planes and assigning Miller indices to them will be referred to as complete determination of crystal orientation or, more briefly, as critical orientation.

Prior attempts to identify the crystal planes by means of Laue photographs involved either examination of a series of these photographs or, alternatively, determination of the crystal orientation by a series of cut and try steps in which Miller indices were tentatively assigned to a particular diffraction spot (or rather the "pole" of this spot plotted on what is known as a stereographic projection) and the Miller indices of the remaining spots were deduced from this by means of the known interplanar angles and interplanar spacing for a crystal of the class being studied. If the initial assumption were correct, the poles on the stereographic projection would be found to bear the proper indices and the proper relation to neighboring poles required for crystals of that class. Often, however, the initial assumption would be incorrect as revealed by the "identification" of poles which did not belong in the class of crystal under study and the process was repeated as often as necessary with new sets of Miller indices being assigned to the original pole at each repetition. This process could be long and laborious, and often required the services of a skilled crystallographer who could utilize such factors as the presence of symmetry elements to reduce the complexity of the identification process.

Accordingly, it is an object of my invention to provide an improved method for determining the complete orientation of the planes of a crystal. A further object of my invention is to provide a method of completely determining crystal orientation which can be utilized quickly and easily by relatively unskilled persons. Another object of my invention is to provide a method of completely determining crystal orientation by means of a single Laue photograph in conjunction with relatively simple measurements on a diffractometer.

During examination of the crystal by means of Laue photographs or with diffractometers, the crystal must be mounted on some type of crystal holder. A goniometer-type crystal holder having three degrees of rotational freedom will be found quite useful for this purpose. After the crystal has been examined by means of a Laue photograph and the initial orientation of the crystal planes with respect to the goniometer axes is determined, it is often desired to transfer the crystal to a diffractometer while preserving the orientation of the crystal with respect to a set of known reference axes. Prior techniques for transferring the crystal to the diffractometer were often quite crude and time consuming. One such technique, which is described in The Crystal Orientation Manual by Elizabeth A. Wood, published by Columbia University Press, 1963, involved positioning a rod adjacent to the crystal, sealing the crystal to the rod by means of hot wax or other suitable sealing material, and subsequently transferring the rod to the diffractometer. In contrast to this cumbersome technique, the present invention contemplates a device wherein the goniometer used in the Laue arrangement may readily be transferred to the diffractometer without remounting the crystal while maintaining the orientation of the crystal with respect to the goniometer and thus the diffractometer.

Accordingly, it is an object of a further aspect of my invention to provide a crystal mounting device which allows standard goniometers to be readily adapted to diffractometer geometry. It is another object of my invention to provide a crystal mounting device which is readily interchangeable between a Laue arrangement and a diffractometer arrangement.

In accordance with my invention, I provide a method and apparatus for determining complete crystal orientation by means of a single Laue photograph in conjunction with subsidiary measurements on a diffractometer. The specimen to be examined is mounted on a standard goniometer and a single Laue photograph of the crystal is taken. Three of the spots on the Laue photograph are then chosen for examination and the initial orientation of the crystal planes corresponding to these spots is determined by well known techniques, for example, by Greninger charts. The goniometer is then attached to the mounting device of my invention which in turn is attached to the diffractometer table. A first crystal plane is selected for examination and is adjusted such that the normal to this plane lies in the plane defined by the incident and diffracted X-rays. The crystal is then scanned by the diffractometer until the diffracted rays are detected by the X-ray detecting device on the diffractometer at the Bragg angle. Since the X-rays used in the diffractometer are essentially monochromatic, their wave length is known and the interplanar spacing of the crystal planes may be determined from knowledge of this wave length and the Bragg equation. From knowledge of the interplanar spacing and the type of crystal system involved, i.e. cubic, rhombohedral, etc., the Miller indices of the selected plane may readily be determined by reference to standard tabulations of interplanar spacing for the class of crystal under study. Having thus identified the first selected crystal plane, the second and third crystal planes are oriented and examined in the manner described above and the Miller indices corresponding to these planes are determined. The poles corresponding to these crystal planes may then be plotted on a stereographic projection and the location of any desired crystal plane, together with its Miller indices, may then be determined from the stereographic projection by means of the three known poles. In this manner, the crystal orientation is completely determined in a rapid and easily followed procedure.

The above and other objects and features of my invention may more readily be understood by reference to the following detailed description of a preferred embodiment thereof which has been selected for purposes of illustration and which is shown in the accompanying drawings in which.

Figure 1:
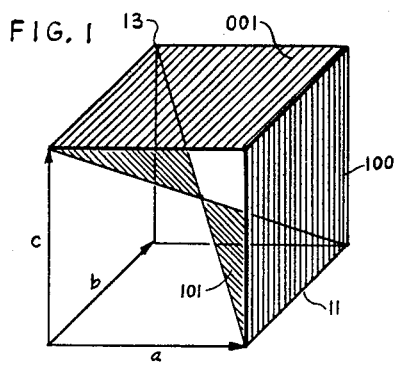
FIGURE 1 is an illustration of the structure of a typical crystal.

Referring now to the drawings, FIGURE 1 shows a crystal of $\alpha$-Fe having a body-centered cubic structure. The crystal 11 has atoms 13 positioned at each corner of a cube; crystallographic reference axes shown as $a$, $b$, and $c$ are centered on one of these atoms. The atoms of the crystal may be viewed as forming sets of planes, each plane being oriented at differing angles with respect to the crystallographic reference axes and having differing Miller indices; some of these planes, with their associated indices are shown in the drawing.

The relative orientation of these planes with respect to a crystal holder may readily be determined by means of a Laue photograph. It is then necessary, however, to determine the orientation of these planes with respect to the crystallographic axes $a$, $b$ and $c$. This requires further analysis of the crystal and it will be found convenient to mount the crystal on a crystal holder which allows rotation of the crystal about various axes referred to the holder. The goniometer type holder is a very convenient crystal holder for this purpose and, accordingly, is the preferred type of crystal holder for use with my invention.

Figure 2:
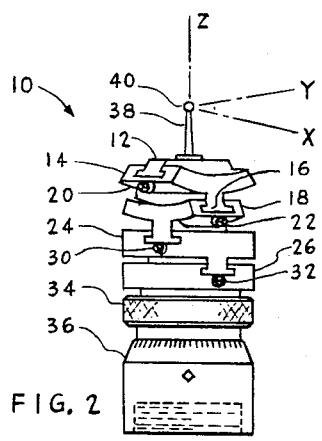
FIGURE 2 is an elevational view of one type of goniometer which may be used with the device of my invention.

FIGURE 2 shows a goniometer having three axes of rotation and two axes of translation. The goniometer 10 has a platform 12 mounted thereon, the lower end of the platform 12 having an arcuate segment on which a suitable angular scale is engraved. This arcuate segment mates with a similar segment on the platform 14 and is rotatable about an axis perpendicular to the angular scale; in FIGURE 2, this axis is shown as the Y axis. A similar pair of platforms 16 and 18 are provided for rotation about an axis perpendicular to the Y axis, the platform 16 corresponding to the platform 12 and the platform 18 corresponding to the platform 14. Keys 20 and 22 are provided for adjusting the angular orientation of the platforms 12 and 14 and the platforms 16 and 18 respectively. The platform 18 is mounted on a translational platform 24 which is capable of movement in the direction of the X axis; the platform 24 in turn is mounted on a translation platform 26 which is capable of movement in the direction of the Y axis. For purposes of illustration in FIGURE 1, the translation of the platforms is shown as being controlled by means of a dove-tailed slot such as slot 28 on the platform 26 and a corresponding slot (not shown) on the platform 24. The magnitude of the translation may be controlled by adjusting keys 30 and 32 respectively. The platform 26 is mounted on a circular rotating ring 34 which rotates the entire goniometer structure about the Z axis, and the ring 34 is mounted on the base 36 of the goniometer which may be threaded to fit on any desired structure. From the above it will be seen that the goniometer shown in FIGURE 2 provides 5 degrees of freedom, and that there is provision for translation in both the X and Y directions and for rotation about the X, Y, and Z axes. A rod 36 is positioned on the platform 12 for receiving the crystal 40.

When it is desired to measure the initial orientation of a crystal, the specimen 40 is affixed to the rod 38 by means of sealing wax or other desired means. The goniometer is then positioned a fixed distance from an unexposed photographic film and the axes of the goniometer are adjusted to the zero position, thus providing a fixed reference for the crystal orientation process. The crystal is then irradiated with X-rays and the resulting diffraction from the crystal is recorded on the film. Although any of several arrangements may be used for taking the X-ray "picture," it will most often be found convenient to use a Laue back-reflection photograph technique in which the X-ray source and the crystal are on opposite sides of the film, the incident rays being channeled through the film by means of a small hole cut in the center of the film for that purpose. The film then records those rays that are diffracted backwards from the crystal.

Since the complete orientation of a crystal may readily be deduced from knowledge of the orientation and indices of any three planes not lying along the same zone axis, three spots on the Laue photograph are selected for examination. These spots are caused by diffraction from the various planes of the crystal and selecting these spots thus corresponds to selecting three planes of the crystal for examination. It is well known in crystallography that the normal to the plane causing the diffracted spot lies in the plane defined by drawing lines from the crystal to the center of the film and to the diffracted spot respectively; accordingly, the angular orientation of the normal to the plane in question with respect to the center of the film may be mathematically computed from measurement of the corresponding angles for the diffracted spot. This relation has been graphically charted for a wide variety of angles in the Laue back-reflection technique and the results presented in the form of a series of curves called a Greninger chart. By centering this chart over a Laue photograph and noting the coordinates of any diffracted spot, the initial angular orientation of a normal to the corresponding plane of the crystal may be read directly from the chart. Since the reference axes of the goniometer supporting the film are related in a known manner to the reference axes of the film, the relative orientation of the selected crystal planes with respect to the goniometer crystal holder is now determined.

The "poles" of these planes, that is, the intersection of the normals to these planes with a reference sphere centered on the crystal, may now be plotted on a sterographic projection, this being a useful method for graphically displaying crystal orientation. In order to obtain the Miller indices of these poles, however, the crystal must be further analyzed. If a diffractometer is to be used for this analysis, the crystal must be transferred to the diffractometer with out disturbing the relative orientation of the crystal planes with respect to the goniometer.

Present diffractometers do not allow a goniometer to be mounted directly thereon. Accordingly, I have developed a device which adapts the goniometer to the geometry of the diffractometer, thereby allowing the crystal to be transferred directly between the Laue arrangement and the diffractometer while maintaining the crystal orientation.

Figure 3:
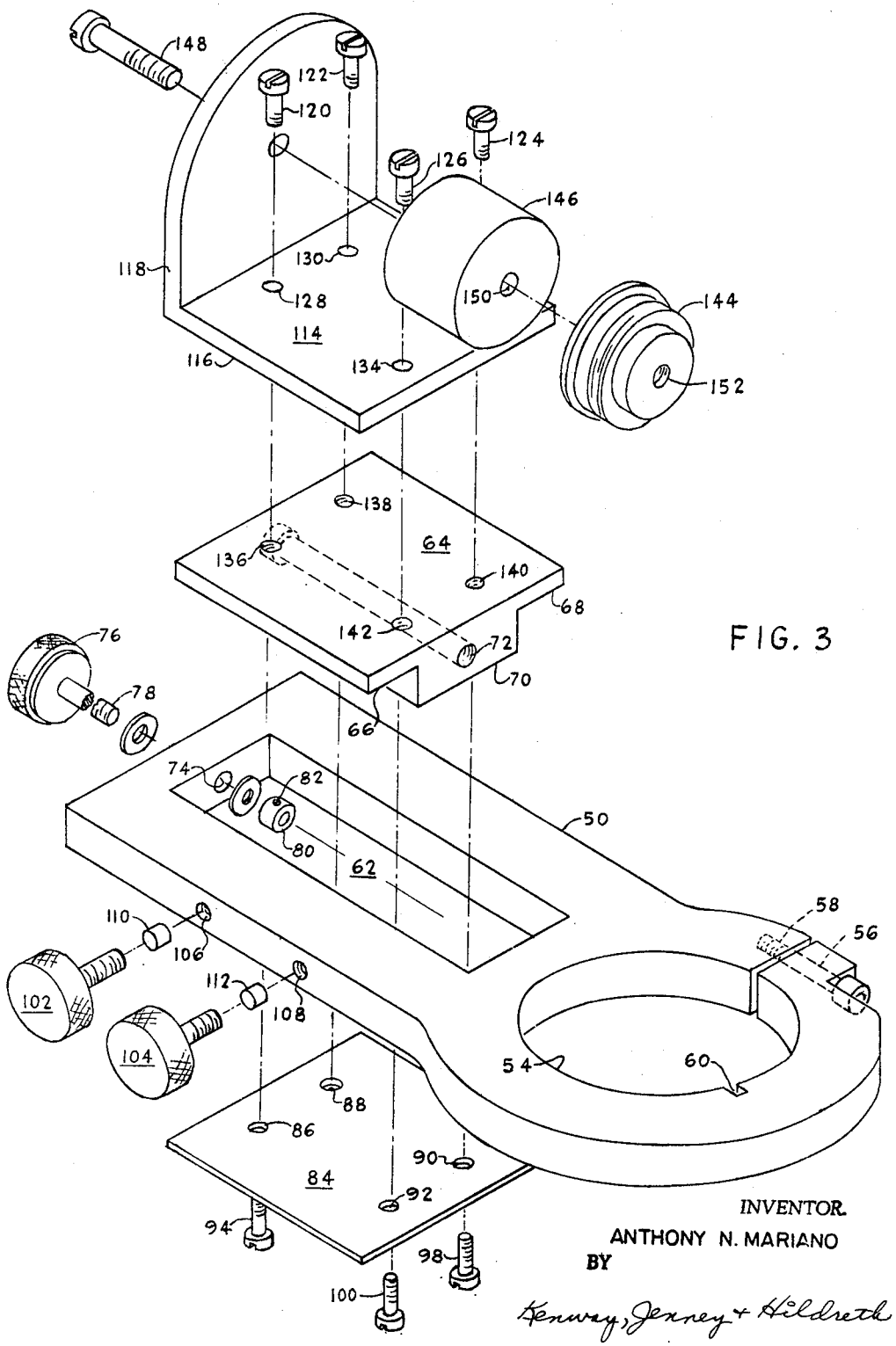
FIGURE 3 is an expanded view in perspective of a crystal mounting device constructed in accordance with my invention.

FIGURE 3 is an expanded perspective view of one embodiment of a crystal mounting device constructed in accordance with my invention. As shown in this figure, there is provided a base plate 50 having one section thereof forming a split ring 52 through the center of which is provided a circular bore 54 for mounting on the base plate of the diffractometer. Threaded bores 56 and 58 are provided for reception of a screw to firmly secure the base plate to the diffractometer; a keyway 60 is provided to prevent slippage of the base plate with respect to the diffractometer hub. A slot 62 is provided through a second segment of the base plate 50 to receive the carriage 64. The carriage 64 has a T-shaped cross-section comprising the arms 66 and 68 and a base portion 70. A threaded bore 72 is provided axially through the carriage 64 and is aligned with the smooth bore 74 which extends axially through the base plate 50. An adjusting knob 76 having a threaded shank 78 is adapted to fit through the bore 74 and the threaded bore 72 of the carriage. A collar 80 is provided to fit over the shank 78 of the adjusting knob 76 and is fastened securely to the adjusting knob by means of the screw 82. During assembly, the base 70 of the carriage 64 is fitted into the bore 62 of the base plate, the arms 66 and 68 of the carriage resting on the upper surface of the base plate on the sides of the bore. The shank 78 of the adjusting knob is fitted through the bore 74 and through the collar 80 and thence into the threaded bore 72 of the carriage 64. The collar 80 is then securely fastened to the shank of the adjusting knob by means of the screw 82. When this screw is securely tightened, rotation of the adjusting knobs 76 will cause an axial movement of the carriage 64 in the bore of the base plate.

In order to provide ridgity for the structure, a back plate 84 having bores 86 through 92 is fitted to the carriage on the lower side of the base plate and is secured to the carriage by means of screws 94 through 100. Side locking knobs 102 and 104 fit into the transverse threaded bores 106 and 108 to provide lateral ridgity for the carriage. Nylon plugs 110 and 112 may be inserted in the bores between the carriage and the shanks of the knobs in order to prevent damage to the carriage from the shanks of the locking nuts. A platform 114 having a vertical segment 116 and a horizontal segment 118 is attached to the carriage 64 by means of the screws 120 through 126 which fit the bores 128 through 134 on the platform 114 and the threaded bores 136 through 142 respectively. A threaded plug 144 for receiving the goniometer is fitted to the horizontal segment of the platform by means of a spacer 146 and a screw 148 which passes through the bore 150 of the fastener and terminates inside the threaded bore 152 of the plug 144.

After the carriage 64 has been inserted in the bore 62 of the base plate 50 and back plate 84, and adjusting knob 76 is attached thereto as described above, the threaded plug 144 and spacer 146 are assembled on the platform 114 and the platform is attached to the carriage 64. The goniometer containing the crystal may then be threaded onto the plug 144 and the carriage 64 may then be moved axially until the crystal is aligned with the center of the bore 54 of the base plate. The center of this bore is designed to coincide with the centerline of the diffractometer.

Figure 4:
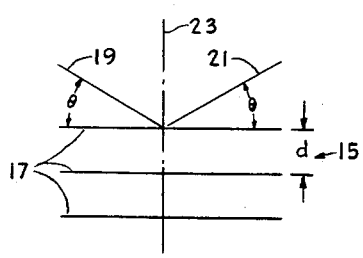
FIGURE 4 is a schematic diagram of a crystal subjected to X-ray irradiation.

FIGURE 4 shows a crystal 15 having parallel planes 17 spaced a distance apart and subjected to X-ray irradiation 19 incident at an angle of $\theta$ to the planes 17. When the Bragg equation $n\lambda = 2d \sin \theta$ is satisfied, the incident rays will be diffracted by the crystal along the direction 21 at an angle equal to the angle of incidence. It will be noted that the normal 23 to the planes 17 lies in the plane formed by the incident and diffracted rays.

After the crystal has been mounted on the diffractometer with the device of my invention, the rotation axes of the goniometer are adjusted by means of the information gained from the Laue photograph until this condition is fulfilled. The normal 23 to the selected planes will then lie along the main axis of the goniometer, that is, the Z axis, and the first selected crystal plane is ready for examination.

Figure 5:
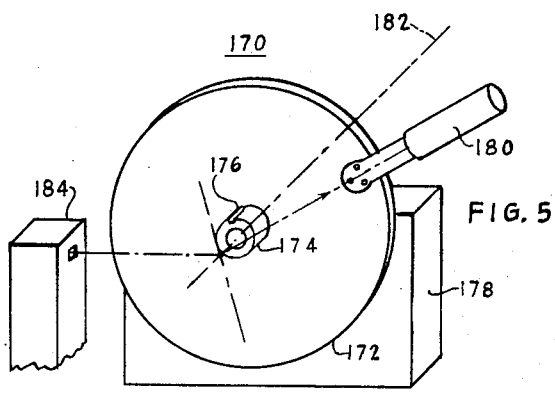
FIGURE 5 is a view in perspective of a vertically mounted diffractometer.

FIGURE 5 shows a vertical diffractometer of the type designed by the North American Philips Co., Inc. The diffractometer 170 has a base 172, a rotatable hub 174 having a key 176, and a supporting structure 178 which houses a motor and gear train assembly. An X-ray detector 180 is arranged on the rim of the base 172 and is positioned to detect rays diffracted from the crystal which is to be positioned at the axis 180 of the diffractometer. An X-ray source 184 is positioned adjacent the diffractometer to supply incident radiation to the crystal.

Figure 6:
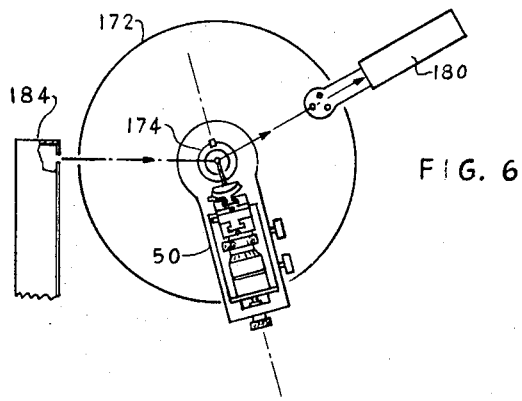
FIGURE 6 is a sketch in the vertical plane of the device of my invention mounted on the diffractometer of FIGURE 5.

FIGURE 6 is a sketch in the vertical plane of the crystal mounting device on my invention positioned on the hub of the diffractometer illustrated in FIGURE 5. The keyway 60 of my mounting device is secured over the key 176 of the diffractometer hub 174 and the slit ring of my device is tightened to securely fasten the mounting device to the hub. In operation, the hub 174 is rotated by the diffractometer motor at a rate of $\theta$ radians per second around the diffractometer axis, while the detector 180 is rotated at twice this rate around this same axis. Referring momentarily to FIGURE 4, it will be seen that operation of the diffractometer in this fashion ensures that the incident and diffracted X-rays maintain the same angle with respect to the crystal planes so that diffraction at the Bragg angle may be detected and measured. Having obtained first order Bragg angle diffraction, the interplanar spacing may then be determined from tables or from the formula $$d = \frac{n\lambda}{2 \sin \theta}$$

and the Miller indices corresponding to the spacing of the selected plane may be obtained from standard comilations such as those issued by the American Society of Testing Materials or the National Bureau of Standards of the United States. Since the interplanar spacing $d$ is determined by the wave length and the Bragg angle $\theta$, it is, of course, possible to obtain the Miller indices from these quantities directly without going through the intermediate step of determining the spacing $d$. Once this has been done, the crystal orientation is completely determined and the orientation and indices of the remaining planes may readily be determined from knowledge of the orientation and indices of the selected planes.

The crystal mounting device of my invention is also useful in translation periodicity studies. It is well known that the crystal may be considered to be composed of a basic unit cell which repeats itself indefinitely in all directions. With the aid of pulse height analysis, the period in which the structure of the unit cell repeats itself in the crystal may be measured by rapidly scanning even minute crystals and measuring the intensity of the diffraction and the angle at which it occurs. Further, the utility of my crystal mounting device as a universal mount for single crystal studies on a diffractometer will be apparent since the orientation of the crystal can accurately and rapidly be adjusted without disturbing the geometry of the diffractometer. It will be apparent that crystals of both large (greater than one inch in diameter) and small (any desired size) size can be accommodated on my device.

Figure 7:
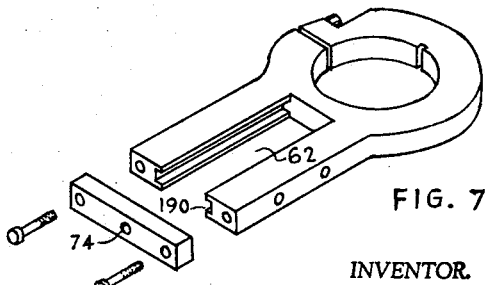
FIGURE 7 is an alternative embodiment of part of a crystal mounting device constructed in accordance with my invention.

It will be apparent that variations may be made in the construction of the crystal mounting device of my invention to suit the particular requirements of the user or manufacturer. In particular, the carriage 64 may be mounted in the base plate 50 by means of slots 190 which are cut in the side walls of the bore 62 of the base plate as shown in FIGURE 7, the carriage then being fitted into these slots for axial movement along the base plate. The rear portion 192 will, of course, be made removable to allow the carriage to be so mounted. If this is done, the carriage may be formed as a single flat plate and the back plate 84 may be dispensed with.

The platform 114 may also be formed as a single piece with the carriage 64. Although it may often be found convenient to have a detachable spacer 146 which can be changed in size to fit the requirements of the user, it will be apparent that this spacer may also be formed as a single piece with the platform 114 or the carriage 64.

The threaded plug 144 illustrated in FIGURE 3 is designed to accommodate a goniometer of the type shown in FIGURE 2. If other types of goniometers or crystal holders are used, of course, the threaded plug 144, which serves as an adapter between the crystal mounting device of my invention and the goniometer or crystal holder, will be changed to fit the particular goniometer or holder used. Further, although I have shown my crystal mounting device as used on a Philip's vertical diffractometer, it will be apparent that the mounting device may be used with any other type of vertical or horizontal diffractometer simply by adjusting the size or the geometry of the mounting portion 52 of my device.

From the above it may be seen that I have provided a simple but efficient method for determining crystal orientation. Further, I have provided a device which may be used in practicing the method of my invention and which readily allows an interchange of the crystal holder between a Laue arrangement and diffractometer geometry. It will also be apparent that I have provided a simple and inexpensive device for mounting crystals on diffractometers.

It will thus be seen that the objects set forth above, among those made apparent from the preceding description, are efficiently attained, and, since certain changes may be made in the above constructions without departing from the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, as a matter of language, might be said to fall therebetween.

Having described my invention, I claim:

1. A method for determining the Miller indices associated with a given crystallographic plane of a crystal comprising the steps of
    (a) mounting the crystal in a holder;
    (b) taking a Laue photograph of the crystal;
    (c) determining from the photograph the angular orientation of at least one plane in the crystal;
    (d) transferring the crystal holder to a diffractometer having a source of essentially monochromatic radiation for incident X-rays and a detector for diffracted X-rays;
    (e) orienting the normal to said plane in the plane of the incident and diffracted X-rays;
    (f) irradiating the crystal and measuring the Bragg angle corresponding to said plane; and
    (g) determining the Miller indices of said plane for the measured Bragg angle and the particular wave length of X-radiation used.

2. A method for determining crystal orientation comprising the steps of
    (a) mounting the crystal in a holder;
    (b) taking a Laue photograph of the crystal;
    (c) determining from the photograph the angular orientation of a plurality of planes in the crystal;
    (d) transferring the crystal holder to a diffractometer having a source of essentially monochromatic radiation for incident X-rays and a detector for diffracted X-rays;
    (e) selecting a first crystal plane for examination by orienting the normal to said plane in the plane of the incident and diffracted X-rays;
    (f) irradiating the crystal and measuring the Bragg angle corresponding to the selected plane;
    (g) determining the miller indices of the selected plane for the measured Bragg angle and the particular wave length of X-radiation used, and
    (h) repeating steps (e) through (g) for the remaining planes.

3. A method of determining crystal orientation comprising the steps of
  (a) mounting the crystal in a holder;
  (b) taking a Laue photograph of the crystal;
  (c) determining from the photograph the angular orientation of a plurality of planes of the crystal;
  (d) transferring the crystal holder to a diffractometer;
  (e) selecting a first crystal plane for examination by orienting said plane parallel to the axis of the diffractometer;
  (f) scanning the crystal with X-rays and monitoring the diffracted X-rays until the Bragg angle corresponding to the selected plane is determined;
  (g) determining the interplanar spacing corresponding to the measured Bragg angle;
  (h) determining the Miller indices corresponding to the interplanar spacing so determined;
  (i) repeating steps (e) to (h) for the remaining planes.

4. A method for determining crystal orientation comprising the steps of
  (a) mounting the crystal in a holder;
  (b) taking a Laue photograph of the crystal;
  (c) determining from the photograph the relative orientation of a plurality of planes in the crystal;
  (d) transferring the crystal holder to a diffractometer having a source of essentially monochromatic radiation for incident X-rays and a detector for diffracted X-rays;
  (e) selecting a first crystal plane for examination by orienting the normal to said plane in the plane of the incident and diffracted X-rays;
  (f) irradiating the crystal and determining the Bragg angle corresponding to the selected plane; and
  (g) determining the interplanar spacing corresponding to the measured Bragg angle and the wave length of X-radiation used;
  (h) determining the Miller indices of the selected plane for the interplanar spacing so determined;
  (i) repeating steps (e) through (h) for the remaining planes.

References Cited

UNITED STATES PATENTS 2,432,913  12/1947  Luley _____ 250—51.5

OTHER REFERENCES

"The Encyclopedia of X-Rays and Gamma Rays," edited by G. L. Clark, Reinhold Publishing Corp., New York, 1963, pages 676–679.

WILLIAM F. LINDQUIST, Primary Examiner